May 30, 1933. C. M. KEANE ET AL 1,911,901
NURSING BOTTLE HOLDER
Original Filed Oct. 30, 1930  2 Sheets-Sheet 1
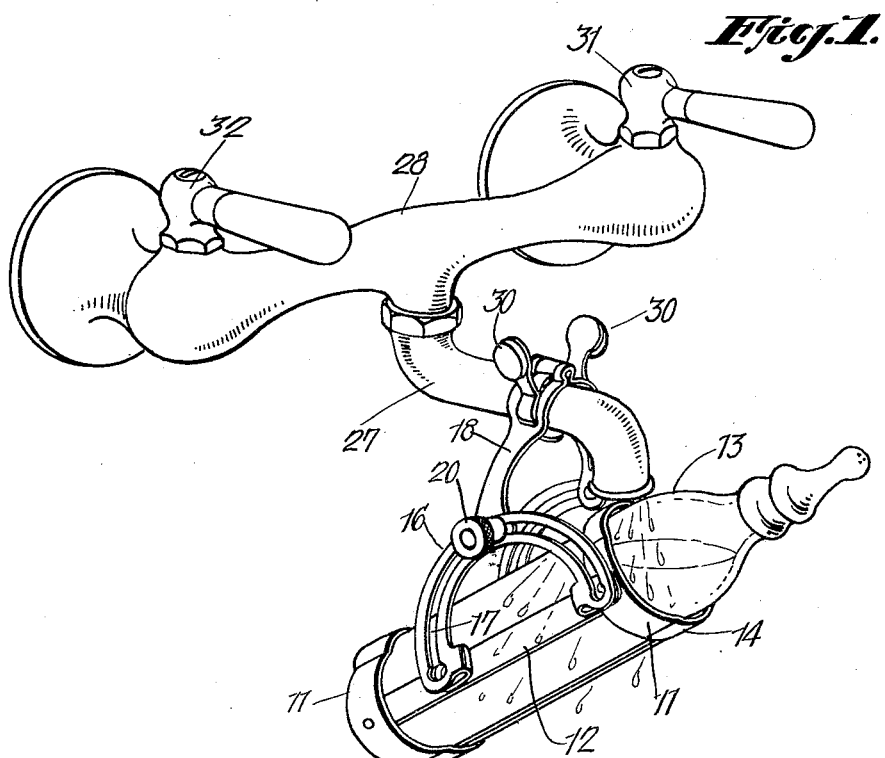
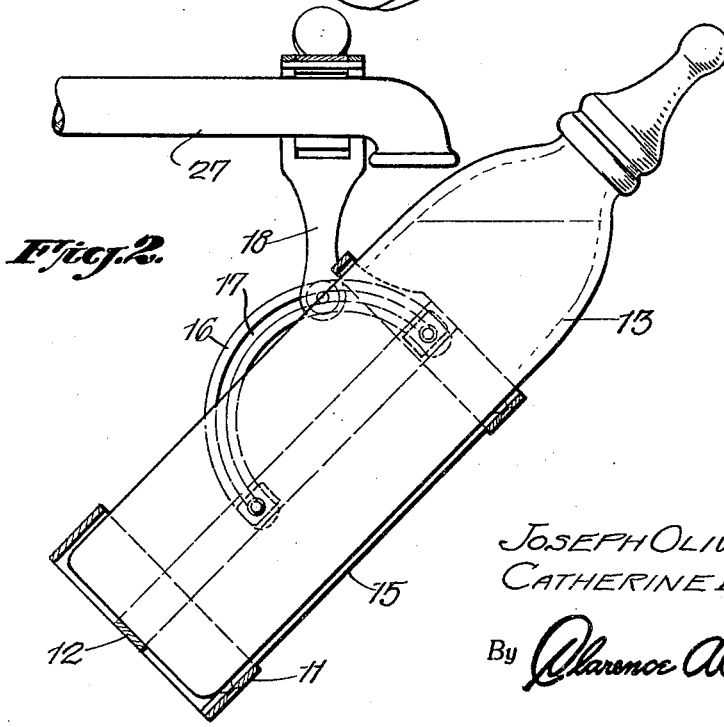
Inventors
JOSEPH OLIVER KEANE.
CATHERINE M. KEANE.
By Clarence A. O'Brien
Attorney May 30, 1933.　　　C. M. KEANE ET AL　　　1,911,901
NURSING BOTTLE HOLDER
Original Filed Oct. 30, 1930　　2 Sheets-Sheet 2
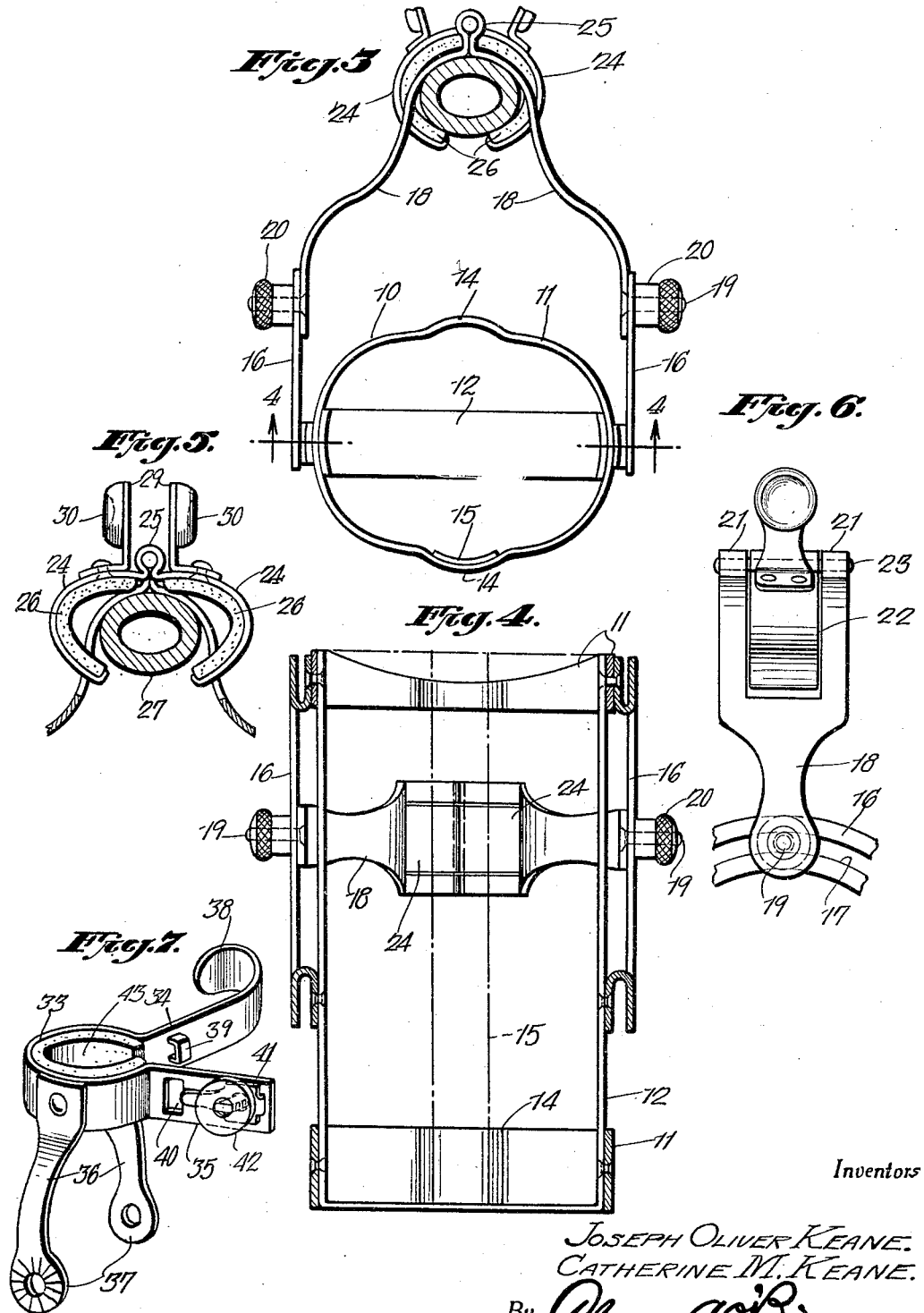
Inventors
JOSEPH OLIVER KEANE
CATHERINE M. KEANE
By Clarence A. O'Brien
Attorney Patented May 30, 1933

1,911,901

UNITED STATES PATENT OFFICE

CATHERINE M. KEANE AND JOSEPH OLIVER KEANE, OF BROOKLYN, NEW YORK

NURSING BOTTLE HOLDER

Application filed October 30, 1930, Serial No. 492,292. Renewed October 21, 1932.

This invention relates to holders in general, and more particularly to nursing bottle holders.

The primary object of the invention resides in a holder for detachable engagement with a water faucet for supporting a nursing bottle in close proximity to the discharge outlet thereof so that the stream of water therefrom may act upon the bottle to either heat or cool the contents to the desired temperature in a sanitary way.

Another object of the invention is to provide a holder which is adjustable so that bottles of various sizes may be supported in an angular position relative to the discharge outlet of a faucet, to subject the full length of the bottle to the water without splashing or wetting the sterilized nipple contained on the mouth end of the bottle.

A further object is to provide a holder of the kind above mentioned with attaching means which is quick and easy of operation to enable the attachment and removal of the same from a faucet.

A still further object is the provision of a nursing bottle holder which is simple of construction, inexpensive of manufacture, and strong and durable for the purposes intended.

With these and other objects in view, the invention resides in the certain novel construction, combination and arrangement of parts, the essential features of which are hereinafter fully described, are particularly pointed out in the appended claims, and are illustrated in the accompanying drawings, in which;

Figure 1 is a perspective view of the invention applied to the spout of a combination hot and cold water faucet, Figure 2 is an enlarged vertical longitudinal sectional view therethrough, Figure 3 is a top plan view but showing the spout in cross section, Figure 4 is a vertical longitudinal sectional view on the line 4—4 of Figure 3, Figure 5 is a horizontal sectional view of the clamping device with the jaws shown in an open position, Figure 6 is a detail side elevational view of the clamping device and its support, and;

Figure 7 is a perspective view of a modified form of clamping device with the jaws shown in open position.

It is understood that at present it is the practice to heat an infant's milk by placing the same in a nursing bottle and then setting the bottle in a saucepan or the like filled with water, and then placing the pan upon a stove. In the event that the contents of the bottle should be heated to a degree higher than that desired, it is necessary to cool the same by holding the bottle under a cold water faucet to lower the temperature. There are many objections to this method of heating infant's milk and it is the purpose of our invention to overcome the same by heating the bottle containing the milk directly from the water supply of a home, thus eliminating the boiling of utensils and the saving of fuel consumption.

Referring to the drawings by reference characters, the numeral 10 designates a bottle receiving frame or basket, the same being constructed of a pair of resilient bands 11 to which are secured the legs of a metal U-shaped strap 12, the bight portion of the strap constituting the bottom of the frame, while the top is open for the insertion and removal of the nursing bottle 13. The bands 11 fold outwardly at diametrically opposite points as at 14 to enable expansion of the bands to accommodate nursing bottles of various shapes and diameter. A single metal strap 15 has its ends secured to the spaced bands 11 and which is disposed intermediate the legs of the U-shaped strap 12 so as to assist in providing a resilient bottle receiving frame. It will be noted that the bottle holder or frame is substantially open throughout in order that the bottle may be subjected to the temperature of the water to be run thereover.

Fixedly secured to the legs of the U-shaped strap 12 are opposed segmental shaped members 16, the same being provided with segmental shaped slots 17 for a purpose to be presently explained. Although the ends of the segment 16 are shown as riveted to the frame, the same may be secured in any other manner desired.

Associated with the bottle receiving frame is a yoke member 18, the terminal ends of the legs of the yoke being provided with threaded bolts or studs 19 which extend outwardly therefrom and which studs pass through the slots 17 in the segments. The outer faces of the terminal ends of the yoke may be roughened for frictional engagement with the inner faces of the segmental members, and threaded to the studs 19 are clamping nuts or buttons 20. It will be seen that by loosening the clamping nuts 20, the yoke 18 may be moved toward or away from opposite ends of the slots in the segments in order to adjust the yoke relative to the bottle receiving frame and the said frame is capable of pivotal movement upon the threaded studs in order that an accurate adjustment of the device may be had with respect to the discharge end of the spout of a faucet.

The yoke member 18 supports a clamping device by which the holder is detachably connected to the spout of the faucet and in Figures 1 to 6 inclusive, the device consists in forming a pair of alined eyes 21 at the bight portion of the yoke member and slotting the yoke as at 22. A pivot pin 23 passes through the alined eyes 21 and supports a pair of coacting resilient jaws 24. The jaws 24 are constructed of a single piece of resilient metal, the same being bent midway between its ends to provide an eye 25 for the passing of the pivot pin 23, the said jaws working through the slot 22 provided in the yoke. The normal tendency of the coacting jaws 24 is to close and when in closed position, they provide a clamp which is substantially elliptical in plan as shown in Figure 3 of the drawings, the inner facing of the jaws being provided with rubber or like cushion elements 26. These elements are substantially semielliptical in plan in order to fit within the jaws 24 and to snugly engage the spout or nozzle 27 of a faucet 28 when the device is in an attached position. The cushion elements 26 serving to frictionally engage the spout without marring the same. Manipulating portions 29 extend outwardly from the jaw members 24 and are provided with heads or buttons 30 which may be grasped by the front and forefinger of an operator when it is desired to move the jaws to an open position against the tension which serves to normally maintain the jaws in clamping or closed position.

In Figure 1 of the drawings we have shown the faucet 28 as a combination hot and cold water fixture, the cold water control faucet being indicated at 31 and the hot water faucet at 32, the same having a common outlet through the spout 27 which is swively connected to the combination fixture. In use, the nursing bottle 13 is inserted in position within the frame 10 and the clamping device secured to the spout 27 so that the holder is suspended below the spout. The clamping nuts or buttons 20 are unscrewed and the bottle supporting frame adjusted so that the top of the bottle just below the neck is disposed adjacent to the discharge outlet of the spout with the bottle supported at an angle of approximately 45 degrees so that water from the spout will be subjected to the full length of the bottle without splashing or wetting the sanitary sterilized nipple provided on the mouth of the nursing bottle. After the desired adjustment has been made, the clamping nuts or buttons 20 are tightened and as long as the same type of bottle is used in connection with the holder, it will be unnecessary to disturb the adjustment but should other size bottles be used, the device may be adjusted accordingly. Assuming that it is desired to heat the milk contents of the nursing bottle 13, the faucet 32 is turned on and the water is permitted to run over the bottle until the contents have been heated to the desired temperature. In the event that the hot water is too hot to subject the nursing bottle to, the cold faucet 31 may be turned on so that the cold water will mix with the hot water and produce the temperature desired. Should the contents of the bottle become too hot, the same may be cooled or brought to the desired temperature by the turning on of the cold water faucet 31 and allowing the cold water to flow upon the bottle.

It will be appreciated that various types of clamping devices may be used in connection with the holder and a modified form of clamp is shown in Figure 7 and which is adapted to that type of faucet having a turned down spout. The clamp shown in Figure 7 embodies a split clamping ring or band 33, the terminal ends of which are bent outwardly in diverging relation to provide arms 34 and 35. Secured to the split band 33 at diametrically opposite points are legs 36 which with the band constitute a yoke member, the terminal ends of which are provided with openings 37 for the passage of bolts or studs by which the clamp may be attached to the segment of the bottle receiving frame hereinbefore described. The terminal end of the arm 34 is bent into a hook or manipulating portion 38 which may be grasped by the thumb or forefinger of an operator for inserting the clamp upon the spout of a faucet. The inner face of the arm 34 is provided with a keeper 39 which is adapted to pass through a slot 40 provided in the arm 35 when the arms 34 and 35 are brought into engagement for contracting the split band about the spout of the faucet. A latch plate 41 is slidably mounted on the outer side of the arm 35 and is held in a locked position by a clamping nut or button 42 after the slide plate 41 has been moved into engagement with the keeper 39. A split rubber washer 43 is secured to the inside of the band 33 for frictionally engaging the spout of the faucet and for preventing marring of the same when the clamp is in attached position.

From the foregoing description, it will be seen that we have provided a nursing bottle holder which may be quickly applied and removed from the spout of a faucet, and when in an applied position, a nursing bottle may be held in a position relative to the discharge outlet of the spout to enable the heating or cooling of the contents of the bottle in a sanitary way.

While we have shown and described what we deem to be the most desirable embodiment of our invention, it is to be understood that various changes in construction may be resorted to if desired and we do not wish to limit ourselves to the precise structural details herein set forth nor to anything less than the whole of our invention limited only by the appended claims.

Having thus described the invention, what is claimed as new and what it is desired to secure by United States Letters Patent is;

1. A nursing bottle holder comprising a bottle receiving frame member, a pair of opposed slotted segments carried by said frame member, a yoke member, threaded studs on the terminal ends of said yoke member and extending through the slots provided in said segments, clamping nuts threaded to said bolts for securing said yoke member in an adjusted position relative to said frame member, and clamping means carried by said yoke member for clamping engagement with the spout of a water faucet.

2. A nursing bottle holder comprising a bottle receiving frame member, a yoke member secured to said frame member including a split resilient band, outwardly diverging arms extending from said split resilient band, and interengaging means for securing said band in a contracted position upon movement of said arms one against the other.

3. A nursing bottle holder comprising a bottle receiving member, a pair of opposed slotted segments carried by said member, a yoke member, pins carried by said yoke member and freely extending through the slots provided in said slotted segments, means for securing said yoke member and said bottle receiving member in a fixed adjusted position, and clamping means carried by said yoke member for securing the device to a supporting structure.

In testimony whereof we affix our signatures.

CATHERINE M. KEANE.
JOSEPH OLIVER KEANE.